United States Patent Office 2,911,392
Patented Nov. 3, 1959

2,911,392

CHLOROPRENE POLYMERS CONTAINING MONO-SUBSTITUTED THIOUREA ACCELERATORS

Lester A. Brooks, East Norwalk, and Jack C. Bacon, Noroton Heights, Conn., assignors to R. T. Vanderbilt Company, Inc., New York, N.Y., a corporation of New York No Drawing. Application June 15, 1956
Serial No. 591,515

20 Claims. (Cl. 260—79.5)

The present invention relates to the vulcanization of chloroprene polymers containing novel accelerators and especially to the vulcanization of the chloroprene polymer known as neoprene type W.

Chloroprene polymers or neoprene are polymers of 2-chloro-1,3-butadiene (chloroprene) and copolymers of chloroprene with dienes or vinyl compounds in which chloroprene comprises the predominant monomer. These polymers or copolymers are usually made in aqueous emulsions and are available to the rubber trade under such names as GR–M, neoprene type GN, neoprene type GNA, neoprene type FR, neoprene type E, neoprene type K, neoprene type KNR, neoprene type W, and neoprene type WRT. The various types of polychloroprene or neoprene differ one from the other in the modifier used in controlling the degree of polymerization of chloroprene, typical modifiers being sulfur, sulfur dioxide, hydrogen sulfide, mercaptans, iodine compounds, and aromatic azo compounds. The chloroprene polymer which has had wide commercial acceptance because of its uniformity in molecular weight distribution and useful properties is neoprene type W, a stabilized chloroprene polymer containing no sulfur, thiuram disulfide, or other compound capable of decomposing to liberate free sulfur or form vulcanization accelerators.

Polychloroprenes differ greatly from other synthetic rubbers and from natural rubber in the manner in which they can be vulcanized. In general, excellent vulcanizates may be obtained from polychloroprenes by incorporating certain metallic oxides, such as zinc oxide and magnesia, into the plastic polychloroprene and heating to effect vulcanization. For certain applications litharge is recommended for use in place of the zinc oxide and magnesia, while for some types sulfur is recommended but is not necessary to effect vulcanization.

When a more rapid rate of cure is desired than is afforded by metallic oxides alone, it has been the custom of the rubber trade to employ organic compounds as accelerators in conjunction with these metallic oxides. Thiocarbanilide or N,N'-diphenylthiourea is an example of an accelerator which has been used heretofore in the vulcanization of natural rubber, while catechol and hexamethylenetetramine are examples of previously used accelerators in the vulcanization of polychloroprene. The accelerator which has proved most effective in the vulcanization of polychloroprene, however, is ethylenethiourea.

It is the object of the present invention to provide a new class of accelerators for the vulcanization of chloroprene polymers and especially for the vulcanization of the chloroprene polymer known as neoprene type W which will impart to the vulcanizates physical properties comparable to or better than those imparted thereto by the heretofore known accelerators.

The accelerators of the present invention are thiourea accelerators having the general formula

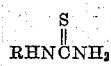

where R is a radical selected from the group consisting of alkyl radicals having from 1 to 6 carbon atoms, alicyclic radicals having from 3 to 6 carbon atoms, and aralkyl radicals having from 7 to 10 carbon atoms. It will be appreciated that when R is an alkyl radical, it may be straight or branched chain. Typical examples of the novel accelerators include benzylthiourea, cyclohexylthiourea, n-butylthiourea, t-butylthiourea, alpha-methylbenzylthiourea, cyclopentylthiourea, and propylthiourea.

The thiourea accelerators of the invention may be prepared by various classical methods among which is the reaction between ammonia and organic isothiocyanates represented by the following equation:

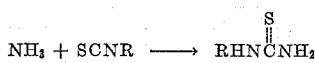

where R is as defined above. A specific illustration of this method as applied to the preparation of butylthiourea is as follows:

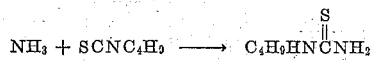

Further details concerning this method of preparation as well as other suitable methods may be readily obtained by reference to the article titled "Thioureas" appearing in Chemical Reviews, volume 55, pages 181–228 (1955) by Dorothy C. Schroeder.

The amount of the accelerator to be employed in the vulcanization of the chloroprene polymers may vary within rather broad limits. In general, from about 0.05% to about 5.0% of the thiourea accelerator based on the weight of the chloroprene polymer is employed. Preferably, from about 0.5% to about 1.0% of the thiourea accelerator based on the weight of the chloroprene polymer present in the stock to be vulcanized is used.

The accelerators may be used with conventional ingredients used in compounding polychloroprene articles. Such ingredients include, for example, antioxidants, fillers, metallic oxides, softeners, colors, and the like.

The invention will be further illustrated by the data presented below in connection with Table I.

A typical polychloroprene elastomer, namely neoprene type W, was compounded by milling together the ingredients in the following base formula:

| Components: | Parts by weight |
|---|---|
| Neoprene type W | 100 |
| Stearic acid | 0.5 |
| Zinc oxide | 5 |
| Extra light calcined magnesium oxide | 2 |
| Agerite stalite | 2 |
| P–33 black | 75 |
| Accelerator | 1.0 |

In the above polychloroprene stock agerite stalite is a proprietary antioxidant composition composed of octylated diphenylamines and P–33 black is a proprietary composition composed of fine thermal carbon black. The polychloroprene stock was vulcanized by air curing at 307° F. for varying lengths of time as set forth in Table I below. The physical properties of the vulcanizate, such as stress, tensile strength, elongation, and hardness, were then measured. The effectiveness of the thiourea accelerators of the invention was compared with conventional accelerators, i.e., thiocarbanilide and ethylenethiourea, by comparing the physical properties of the vulcanizates formed by using the various accelerators. In Table I below the accelerators designated by numbers 1 through 5 were respectively (1) benzylthiourea, (2) cyclohexylthiourea, (3) n-butylthiourea, (4) t-butylthiourea, and (5) alpha-methylbenzylthiourea.

Table I

| Accelerator | 1 | 2 | 3 | 4 | 5 | Thiocarbanilide | Ethylenethiourea |
|---|---|---|---|---|---|---|---|
| Stress in P.s.i. at 300% Elongation | | | | | | | |
| Air Cure in Minutes at 307° F.: | | | | | | | |
| 10 | 1,660 | 1,600 | 1,940 | 1,830 | 1,650 | 1,370 | 1,540 |
| 20 | 1,890 | 1,920 | 2,040 | 1,980 | 1,900 | 1,420 | 1,900 |
| 30 | 1,980 | 2,010 | 2,090 | 2,060 | 1,990 | 1,450 | 1,980 |
| 45 | 2,020 | 2,040 | 2,090 | 2,080 | 2,080 | 1,830 | 2,090 |
| Tensile Strength in P.s.i. | | | | | | | |
| 10 | 1,950 | 2,010 | 2,100 | 2,000 | 1,990 | 2,060 | 1,880 |
| 20 | 2,020 | 2,160 | 2,150 | 2,070 | 2,080 | 2,200 | 1,990 |
| 30 | 2,100 | 2,190 | 2,200 | 2,100 | 2,140 | 2,200 | 2,030 |
| 45 | 2,150 | 2,190 | 2,220 | 2,120 | 2,150 | 2,200 | 2,090 |
| Percent Elongation at Break | | | | | | | |
| 10 | 430 | 450 | 350 | 370 | 440 | 480 | 460 |
| 20 | 390 | 400 | 340 | 340 | 380 | 450 | 340 |
| 30 | 380 | 390 | 340 | 330 | 360 | 420 | 340 |
| 45 | 370 | 370 | 340 | 330 | 320 | 420 | 330 |
| Shore Hardness No. | | | | | | | |
| 10 | 67 | 66 | 68 | 68 | 67 | 57 | 63 |
| 20 | 70 | 69 | 69 | 70 | 69 | 58 | 65 |
| 30 | 70 | 69 | 70 | 70 | 70 | 59 | 65 |
| 45 | 70 | 70 | 70 | 70 | 70 | 66 | 71 |

From a study of the data presented in Table I above it may be readily seen that the thioureas of the invention all act as accelerators in the curing of polychloroprene. In addition, the accelerators of the invention impart to the vulcanizates physical properties comparable to or better than the physical properties imparted to vulcanizates which are cured by the use of the heretofore known accelerators, i.e., thiocarbanilide and ethylenethiourea. Thus it will be seen that the hardness values for the vulcanizates formed by using the accelerators of the invention are superior (higher) to the hardness values of the vulcanizates formed by using conventional accelerators. It will be appreciated that accelerators of the invention other than those set forth in Table I may be employed with comparable results and that they may be used with chloroprene polymers other than Neoprene type W.

Various modifications and changes may be made in the invention herein set forth without departing from the spirit thereof and accordingly the invention is to be limited only within the scope of the appended claims.

We claim:

1. A vulcanizable polychloroprene composition comprising an unvulcanized chloroprene polymer and from about 0.05% to about 5.0% of the weight of the polymer of a thiourea compound capable of acting by itself as a vulcanization accelerator for the polymer and having the general formula $$\underset{RHNCNH_2}{\overset{S}{\parallel}}$$

where R is a radical selected from the group consisting of alkyl radicals having from 1 to 6 carbon atoms, alicyclic radicals having from 3 to 6 carbon atoms, and aralkyl radicals having from 7 to 10 carbon atoms.

2. A vulcanizable polychloroprene composition comprising an unvulcanized chloroprene polymer and from about 0.5% to about 1.0% of the weight of the polymer of a thiourea compound capable of acting by itself as a vulcanization accelerator for the polymer and having the general formula $$\underset{RHNCNH_2}{\overset{S}{\parallel}}$$

where R is a radical selected from the group consisting of alkyl radicals having from 1 to 6 carbon atoms, alicyclic radicals having from 3 to 6 carbon atoms, and aralkyl radicals having from 7 to 10 carbon atoms.

3. A composition as set forth in claim 2 wherein the thiourea compound is cyclohexylthiourea.

4. A composition as set forth in claim 2 wherein the thiourea compound is a butylthiourea.

5. A composition as set forth in claim 2 wherein the thiourea compound is alpha-methylbenzylthiourea.

6. A vulcanizable polychloroprene composition comprising sulfur free polychloroprene and from about 0.05% to about 5.0% of the weight of the polymer of a thiourea compound capable of acting by itself as a vulcanization accelerator for the polymer and having the general formula $$\underset{RHNCNH_2}{\overset{S}{\parallel}}$$

where R is a radical selected from the group consisting of alkyl radicals having from 1 to 6 carbon atoms, alicyclic radicals having from 3 to 6 carbon atoms, and aralkyl radicals having from 7 to 10 carbon atoms.

7. A vulcanizable polychloroprene composition comprising sulfur free polychloroprene and from about 0.5% to about 1.0% of the weight of the polymer of a thiourea compound capable of acting by itself as a vulcanization accelerator for the polymer and having the general formula $$\underset{RHNCNH_2}{\overset{S}{\parallel}}$$

where R is a radical selected from the group consisting of alkyl radicals having from 1 to 6 carbon atoms, alicyclic radicals having from 3 to 6 carbon atoms, and aralkyl radicals having from 7 to 10 carbon atoms.

8. A composition as set forth in claim 7 wherein the thiourea compound is cyclohexylthiourea.

9. A composition as set forth in claim 7 wherein the thiourea compound is a butylthiourea.

10. A composition as set forth in claim 7 wherein the thiourea compound is alpha-methylbenzylthiourea.

11. The process of vulcanizing chloroprene polymers comprising incorporating in a chloroprene polymer stock from about 0.05% to about 5.0% of the weight of the polymer of a thiourea compound capable of acting by itself as a vulcanization accelerator for the polymer and having the general formula

where R is a radical selected from the group consisting of alkyl radicals having from 1 to 6 carbon atoms, alicyclic radicals having from 3 to 6 carbon atoms, and aralkyl radicals having from 7 to 10 carbon atoms, and heating at vulcanizing temperatures to cure the polymer.

12. The process of vulcanizing chloroprene polymers comprising incorporating in a chloroprene polymer stock from about 0.5% to about 1.0% of the weight of the polymer of a thiourea compound capable of acting by itself as a vulcanization accelerator for the polymer and having the general formula

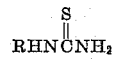

where R is a radical selected from the group consisting of alkyl radicals having from 1 to 6 carbon atoms, alicyclic radicals having from 3 to 6 carbon atoms, and aralkyl radicals having from 7 to 10 carbon atoms, and heating at vulcanizing temperatures to cure the polymer.

13. The process as set forth in claim 12 wherein the thiourea compound is cyclohexylthiourea.

14. The process as set forth in claim 12 wherein the thiourea compound is a butylthiourea.

15. The process as set forth in claim 12 wherein the thiourea compound is alpha-methylbenzylthiourea.

16. The process of vulcanizing chloroprene polymers comprising incorporating in sulfur free polychloroprene stock from about 0.05% to about 5.0% of the weight of the polymer of a thiourea compound capable of acting by itself as a vulcanization accelerator for the polymer and having the general formula

where R is a radical selected from the group consisting of alkyl radicals having from 1 to 6 carbon atoms, alicyclic radicals having from 3 to 6 carbon atoms, and aralkyl radicals having from 7 to 10 carbon atoms, and heating at vulcanizing temperatures to cure the polymer.

17. The process of vulcanizing chloroprene polymers comprising incorporating in sulfur free polychloroprene stock from about 0.5% to about 1.0% of the weight of the polymer of a thiourea compound capable of acting by itself as a vulcanization accelerator for the polymer and having the general formula

where R is a radical selected from the group consisting of alkyl radicals having from 1 to 6 carbon atoms, alicyclic radicals having from 3 to 6 carbon atoms, and aralkyl radicals having from 7 to 10 carbon atoms, and heating at vulcanizing temperatures to cure the polymer.

18. The process as set forth in claim 17 wherein the thiourea compound is cyclohexylthiourea.

19. The process as set forth in claim 17 wherein the thiourea compound is a butylthiourea.

20. The process as set forth in claim 17 wherein the thiourea compound is alpha-methylbenzylthiourea.

References Cited in the file of this patent

UNITED STATES PATENTS

| | | |
|---|---|---|
| 2,071,966 | Bolton | Feb. 23, 1937 |
| 2,397,399 | Baird | Mar. 26, 1946 |
| 2,544,746 | Baum | Mar. 13, 1951 |
| 2,804,447 | Naylor | Aug. 27, 1957 |

OTHER REFERENCES

Dehn: J. Am. Chem. Soc., 62, 3189, 3190 (November 1940).